United States Patent
Atsumi et al.

(10) Patent No.: US 10,160,493 B2
(45) Date of Patent: Dec. 25, 2018

(54) VEHICLE FRAMEWORK STRUCTURE

(71) Applicant: TOYOTA JIDOSHA KABUSHIKI KAISHA, Toyota-shi (JP)

(72) Inventors: Hyuga Atsumi, Toyota (JP); Kenichiro Yoshimoto, Tokai (JP); Junichi Takayanagi, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 178 days.

(21) Appl. No.: 15/225,346

(22) Filed: Aug. 1, 2016

(65) Prior Publication Data

US 2017/0073012 A1    Mar. 16, 2017

(30) Foreign Application Priority Data

Sep. 15, 2015  (JP) .................................. 2015-182309

(51) Int. Cl.
  *B62D 25/20*  (2006.01)
  *B62D 21/15*  (2006.01)

(52) U.S. Cl.
  CPC ....... *B62D 21/152* (2013.01); *B62D 25/2018* (2013.01)

(58) Field of Classification Search
  CPC .... B62D 25/08; B62D 25/20; B62D 25/2018; B62D 25/145; B62D 25/2036; B62D 21/152
  See application file for complete search history.

(56) References Cited

U.S. PATENT DOCUMENTS

| 2002/0195840 | A1* | 12/2002 | Mishima | ................ | B62D 25/06 296/203.01 |
| 2008/0084092 | A1* | 4/2008 | Yokoi | ................ | B62D 25/2018 296/203.02 |
| 2015/0008703 | A1* | 1/2015 | Furusaki | .............. | B62D 21/152 296/187.08 |
| 2015/0145284 | A1* | 5/2015 | Nishida | .............. | B62D 25/2036 296/187.1 |

(Continued)

FOREIGN PATENT DOCUMENTS

| EP | 0421277 A1 * | 4/1991 | .......... B62D 21/152 |
| JP | 2009-248593 | 10/2009 | |

(Continued)

*Primary Examiner* — Hilary L Gutman
(74) *Attorney, Agent, or Firm* — Oblon, McClelland, Maier & Neustadt, L.L.P.

(57) ABSTRACT

A vehicle framework structure includes a tunnel, a pair of rockers, a dash cross-member, a front side member rear and a floor reinforcement. The tunnel is disposed at a vehicle width direction central portion of a floor panel of a vehicle. The rockers are disposed at each vehicle width direction outer sides of the floor panel. The dash cross-member connects front portions of the rockers with the tunnel. A front side member is disposed at the vehicle front-and-rear direction front side of the floor panel. The front side member rear is provided under the floor panel at the vehicle front-and-rear direction rear side of the front side member. A vehicle front-and-rear direction front portion of the floor reinforcement is disposed between the dash cross-member and the floor panel, and the floor reinforcement is joined to the floor panel and to the front side member rear.

12 Claims, 5 Drawing Sheets

(56) References Cited

U.S. PATENT DOCUMENTS

| | | | |
|---|---|---|---|
| 2015/0232127 A1* | 8/2015 | Atsumi | B62D 25/20 296/187.08 |
| 2016/0001817 A1* | 1/2016 | Atsumi | B60R 19/023 296/187.09 |
| 2016/0052561 A1* | 2/2016 | Atsumi | B62D 25/2045 296/187.08 |
| 2017/0015363 A1* | 1/2017 | Song | B62D 25/04 |

FOREIGN PATENT DOCUMENTS

| | | | | |
|---|---|---|---|---|
| JP | 2009-286181 | | 12/2009 | |
| JP | 2013-10424 A | | 1/2013 | |
| JP | 2014-43133 A | | 3/2014 | |
| JP | 2015-101217 A | | 6/2015 | |
| WO | WO-2017163307 A1 * | | 9/2017 | B62D 25/20 |

\* cited by examiner

VEHICLE FRAMEWORK STRUCTURE

CROSS-REFERENCE TO RELATED APPLICATION

This application claims priority under 35 USC 119 from Japanese Patent Application No. 2015-182309 filed Sep. 15, 2015, the disclosure of which is incorporated by reference herein.

BACKGROUND

Technical Field

The present invention relates to a vehicle framework structure of an automobile.

Related Art

A technology has been disclosed, for example, in Japanese Patent Application Laid-Open (JP-A) No. 2009-248593, in which a dash cross-member that protrudes to an upper side is arranged along a vehicle width direction between a rocker and a tunnel, and an upper reinforcement (below referred to as a floor reinforcement) that extends in a vehicle front-and-rear direction is joined to the dash cross-member. Thus, because the floor reinforcement is joined to the dash cross-member, a load from a collision load that acts on the dash cross-member may be reduced in the related art technology.

However, in JP-A No. 2009-248593, in a region in which the dash cross-member and the floor reinforcement intersect, the dash cross-member is given priority over the floor reinforcement and the floor reinforcement is divided in the vehicle front-and-rear direction by the dash cross-member. Meanwhile, at the lower side of a floor panel, an under reinforcement (below referred to as a front side member rear) that extends in the vehicle front-and-rear direction is provided at the rear side of a front side member that extends in the vehicle front-and-rear direction at a vehicle front portion. Therefore, in the region in which the floor reinforcement is divided, the floor reinforcement is not joined to the front side member rear.

Consequently, if a collision load is inputted in the vehicle front-and-rear direction such that the rear side of the front side member deforms toward the upper side as in, for example, a small overlap collision, an oblique collision or the like, a load transmission efficiency with which the collision load is transmitted in the vehicle front-and-rear direction from the front side member rear to the floor reinforcement may be reduced.

SUMMARY

The present invention provides a vehicle framework structure in which a collision load may be efficiently transmitted from a front side member rear to a floor reinforcement.

A vehicle framework structure of a first aspect of the present invention includes: a tunnel disposed at a vehicle width direction central portion of a floor panel of a vehicle, the tunnel extending in a vehicle front-and-rear direction; a pair of rockers disposed at each vehicle width direction outer sides of the floor panel, the rockers extending in the vehicle front-and-rear direction; a dash cross-member that connects front portions of the rockers with the tunnel in a vehicle width direction; a front side member rear that is provided under the floor panel at a vehicle front-and-rear direction rear side of a front side member, the front side member being disposed at a vehicle front-and-rear direction front side of the floor panel and extending in the vehicle front-and-rear direction, and the front side member rear forming a closed cross section portion between the front side member rear and a lower face of the floor panel; and a floor reinforcement that extends in the vehicle front-and-rear direction above the floor panel, a vehicle front-and-rear direction front portion of the floor reinforcement being disposed between the dash cross-member and the floor panel in a vehicle up-and-down direction, and the floor reinforcement being joined to the floor panel and to the front side member rear.

In the first aspect, the tunnel is disposed to extend in the vehicle front-and-rear direction at the vehicle width direction central portion of the floor panel of the vehicle, and the pair of rockers are disposed to extend in the vehicle front-and-rear direction at each the vehicle width direction outer sides of the floor panel. The dash cross-member is disposed to connect the front portions of the rockers with the tunnel in the vehicle width direction.

Each front side member is disposed at the vehicle front-and-rear direction front side of the floor panel. The front side member extends in the vehicle front-and-rear direction. The front side member rear is provided at the vehicle front-and-rear direction rear side of the front side member. The front side member rear is provided below the floor panel and forms a closed cross section portion between the front side member rear and the lower face of the floor panel. The floor reinforcement extends in the vehicle front-and-rear direction above the floor panel. The vehicle front-and-rear direction front portion of the floor reinforcement is disposed between the dash cross-member and the floor panel in the vehicle up-and-down direction, and is joined to the floor panel and to the front side member rear.

That is, in the present invention, because the floor reinforcement is disposed at the lower side of the dash cross-member, the floor reinforcement is not divided in the vehicle front-and-rear direction by a dash panel. Moreover, because the floor reinforcement is joined to the front side member rear, a collision load transmitted from the front side member rear may be transmitted to the floor reinforcement efficiently.

In a vehicle framework structure of a second aspect of the present invention, in the first aspect, the dash cross-member includes: a front wall portion that is arranged along the vehicle width direction, at a front portion of the dash cross-member in the vehicle front-and-rear direction; a rear wall portion that opposes the front wall portion and is arranged along the vehicle width direction, at a rear portion of the dash cross-member in the vehicle front-and-rear direction; an upper wall portion that is disposed at an upper portion of the dash cross-member in the vehicle up-and-down direction, spans between an upper end portion of the front wall portion and an upper end portion of the rear wall portion, and is arranged along the vehicle width direction; a front ridgeline formed by the front wall portion and the upper wall portion, the front ridgeline being continuous in the vehicle width direction; and a rear ridgeline formed by the upper wall portion and the rear wall portion, the rear ridgeline being continuous in the vehicle width direction.

In the second aspect, the dash cross-member includes the front wall portion, the rear wall portion and the upper wall portion. The front wall portion is arranged along the vehicle width direction at the vehicle front-and-rear direction front portion of the dash cross-member. The rear wall portion is arranged along the vehicle width direction, opposing the front wall portion, at the vehicle front-and-rear direction rear portion of the dash cross-member. The upper wall portion is arranged along the vehicle width direction at the vehicle up-and-down direction upper portion of the dash cross-member. The upper wall portion spans between the upper end portion of the front wall portion and the upper end portion of the rear wall portion.

In this structure, the front ridgeline is formed by the front wall portion and the upper wall portion of the dash cross-member, and the rear ridgeline is formed by the upper wall portion and the rear wall portion of the dash cross-member. The front ridgeline and the rear ridgeline are formed to be continuous in the vehicle width direction. Therefore, strength and stiffness of the dash cross-member may be improved compared to a structure in which the ridgelines are not formed.

In a vehicle framework structure of a third aspect of the present invention, in the first aspect or the second aspect, at an intersection portion at which the dash cross-member intersects with the floor reinforcement, the dash cross-member is formed along a shape of the floor reinforcement in a direction intersecting the direction in which the floor reinforcement extends.

In the third aspect, the intersection portion at which the dash cross-member intersects with the floor reinforcement is provided. In this structure, the dash cross-member that is disposed at the upper side of the floor reinforcement connects the rockers and the tunnel in the vehicle width direction. Thus, the dash cross-member is superposed over the floor reinforcement at the intersection portion by being formed along the shape of the floor reinforcement in the direction intersecting the direction of extension of the floor reinforcement. Consequently, when a collision load is inputted from the lower side of the floor reinforcement, the dash cross-member acts as a structure that holds down the floor reinforcement from the upper side. Thus, stiffness at the intersection portion is improved. That is, deformation of the floor reinforcement may be suppressed.

In a vehicle framework structure of a fourth aspect of the present invention, in the third aspect, the upper wall portion is disposed at the upper portion of the dash cross-member in the vehicle up-and-down direction, and heights of the upper wall portion from the floor panel are specified to be the same over the vehicle width direction with reference to a height of the upper wall portion at the intersection portion.

At the intersection portion of the dash cross-member, the dash cross-member is disposed at the upper side of the floor reinforcement. Therefore, a height of the upper wall portion of the dash cross-member will usually be highest at the intersection portion.

Accordingly, in the fourth aspect, the height of the upper wall portion of the dash cross-member is specified to be the same over the vehicle width direction with reference to the height of the upper wall portion from the floor panel at the intersection portion. Therefore, the front ridgeline and rear ridgeline formed at the upper wall portion of the dash cross-member are formed at the same heights from the floor panel along the vehicle width direction. Consequently, load transmission losses may be reduced compared to a structure in which ridgelines of a dash cross-member are not formed in straight lines. Note that the meaning of the term "same" as used herein includes the meaning "substantially the same".

In a vehicle framework structure of a fifth aspect of the present invention, in any of the second to fourth aspects, the front wall portion is disposed at the front portion of the dash cross-member in the vehicle front-and-rear direction, an abutting wall is provided at a distal end portion of the floor reinforcement in the vehicle front-and-rear direction, and the front wall portion abuts against the abutting wall at the vehicle front-and-rear direction rear side of the front wall portion.

In the fifth aspect, the abutting wall is provided at the distal end portion of the floor reinforcement in the vehicle front-and-rear direction. The front wall portion abuts against the vehicle front-and-rear direction rear side of the front wall portion of the dash cross-member. Therefore, the stiffness of the intersection portion may be improved. Thus, the load transmission efficiency of the intersection portion may be improved.

In a vehicle framework structure of a sixth aspect of the present invention, in any of the first to fifth aspects, at the intersection portion at which the dash cross-member intersects with the floor reinforcement, a penetrating hole is formed at a location of the intersection portion that coincides in plan view with a joining portion at which the floor reinforcement, the floor panel and the front side member rear are joined.

In the sixth aspect, each penetrating hole is formed in the intersection portion of the dash cross-member. The penetrating hole is formed at a location that coincides in plan view with the joining portion at which the floor reinforcement, the floor panel and the front side member rear are joined. Therefore, the floor reinforcement, the floor panel and the front side member rear may be joined to one another through the penetrating hole. Thus, the floor reinforcement, the floor panel and the front side member rear may be joined securely.

BRIEF DESCRIPTION OF THE DRAWINGS

Exemplary Embodiments of the present invention will be described in detail based on the following figures, wherein.

DETAILED DESCRIPTION

Figure 2:
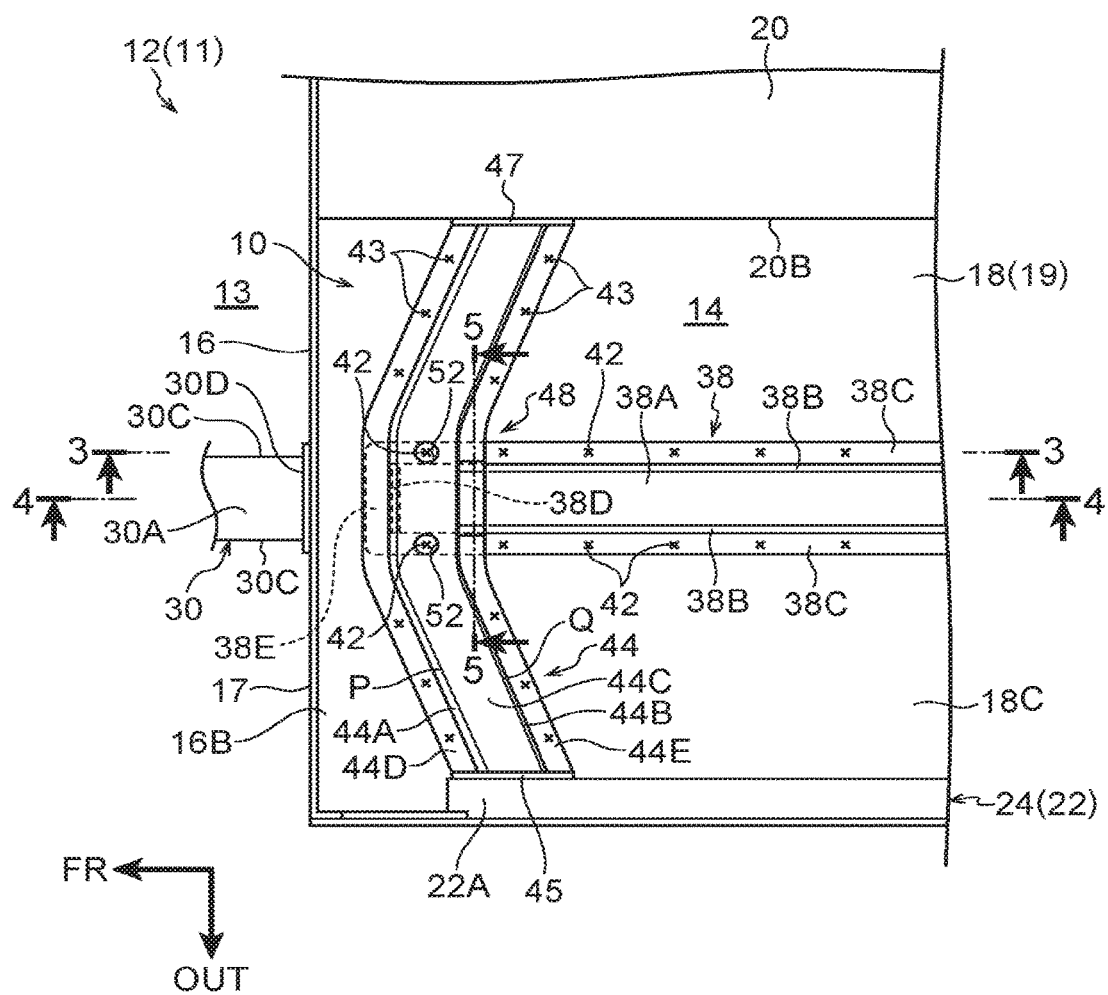
FIG. 2 is a schematic plan view showing the vehicle framework structure in accordance with the present exemplary embodiment.
Figure 3:
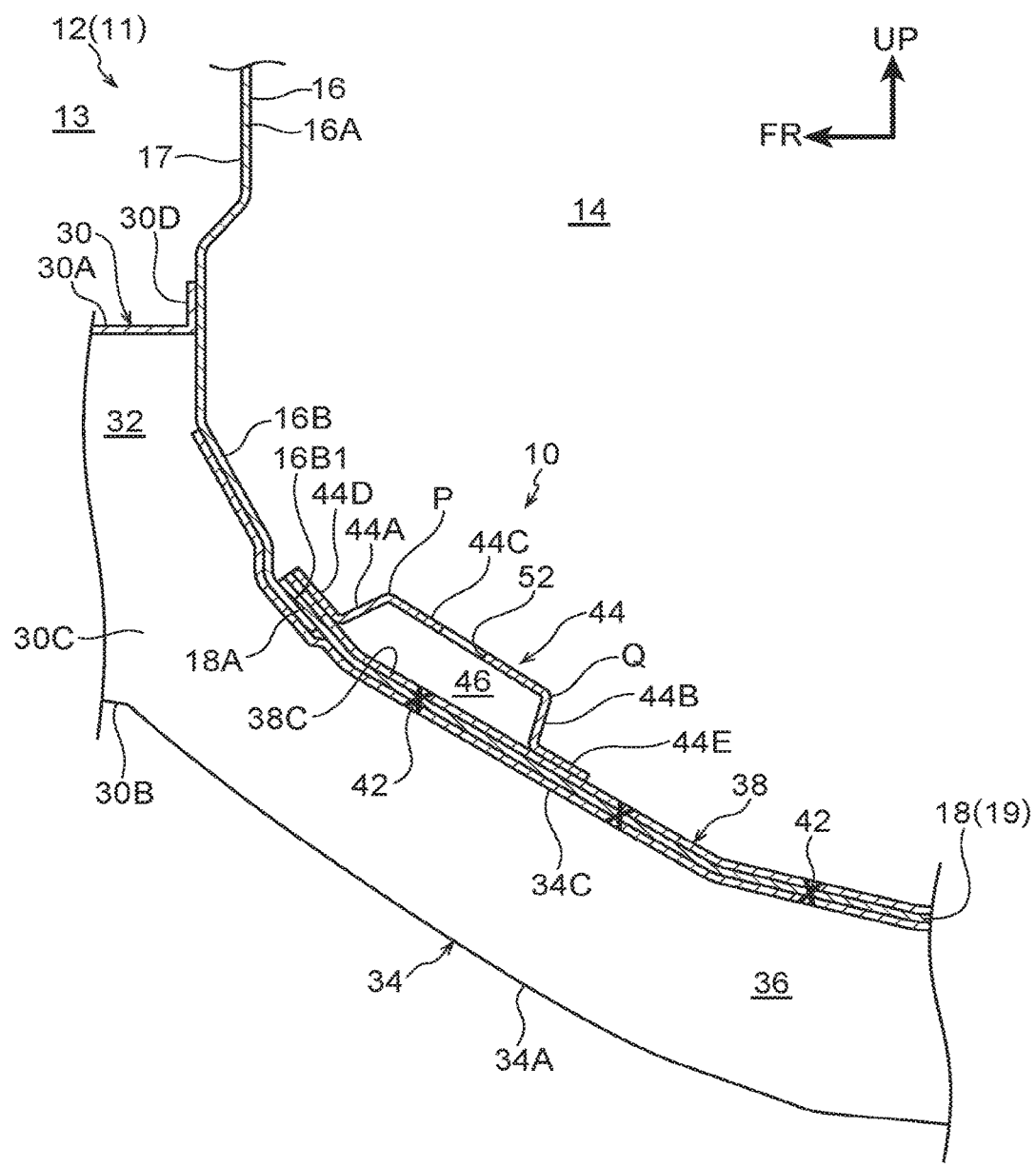
FIG. 3 is a sectional diagram cut along line 3-3 in FIG. 2.
Figure 4:
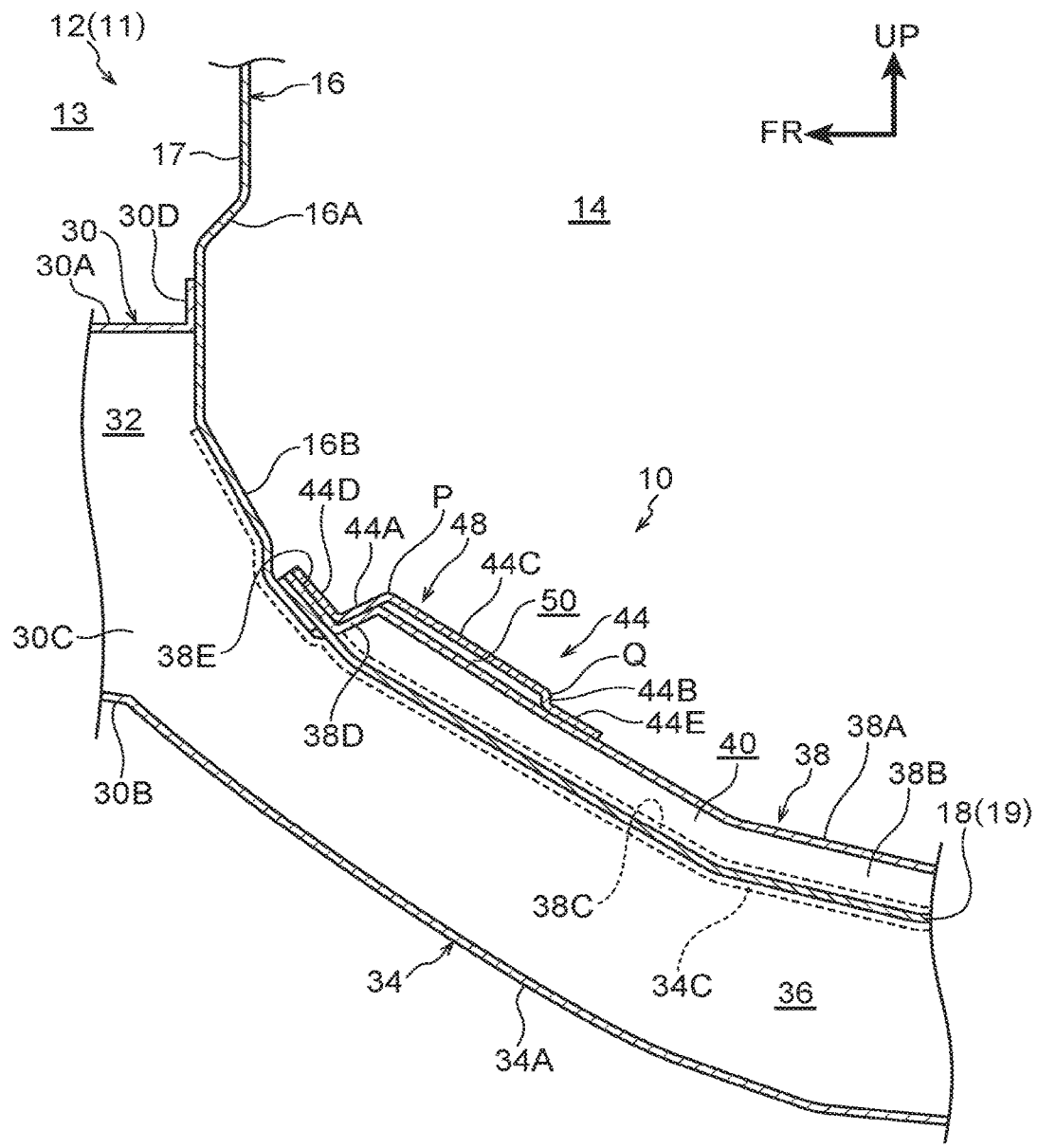
FIG. 4 is a sectional diagram cut along line 4-4 in FIG. 2.

Herebelow, an exemplary embodiment relating to the present invention is described in detail in accordance with the drawings. The arrow FR, arrow UP and arrow OUT that are shown where appropriate in the drawings indicate, respectively, a front direction, an upper direction and a vehicle width direction outer direction of a vehicle in which a vehicle lower portion structure according to an exemplary embodiment of the present invention is employed. Herebelow, where descriptions are given simply using the directions front, rear, up, down, left and right, unless otherwise specified, these represent the front and rear in the vehicle front-and-rear direction, up and down in the vehicle up-and-down direction, and left and right when facing forward. Although FIG. 2 to FIG. 4 show the left side of the vehicle body, the right side of the vehicle body is the same, with left-to-right symmetry. Accordingly, descriptions of the right side of the vehicle body are omitted as appropriate.

Structures of the Vehicle Framework Structure

First, structures of the vehicle framework structure according to the present exemplary embodiment are described.

Figure 1:
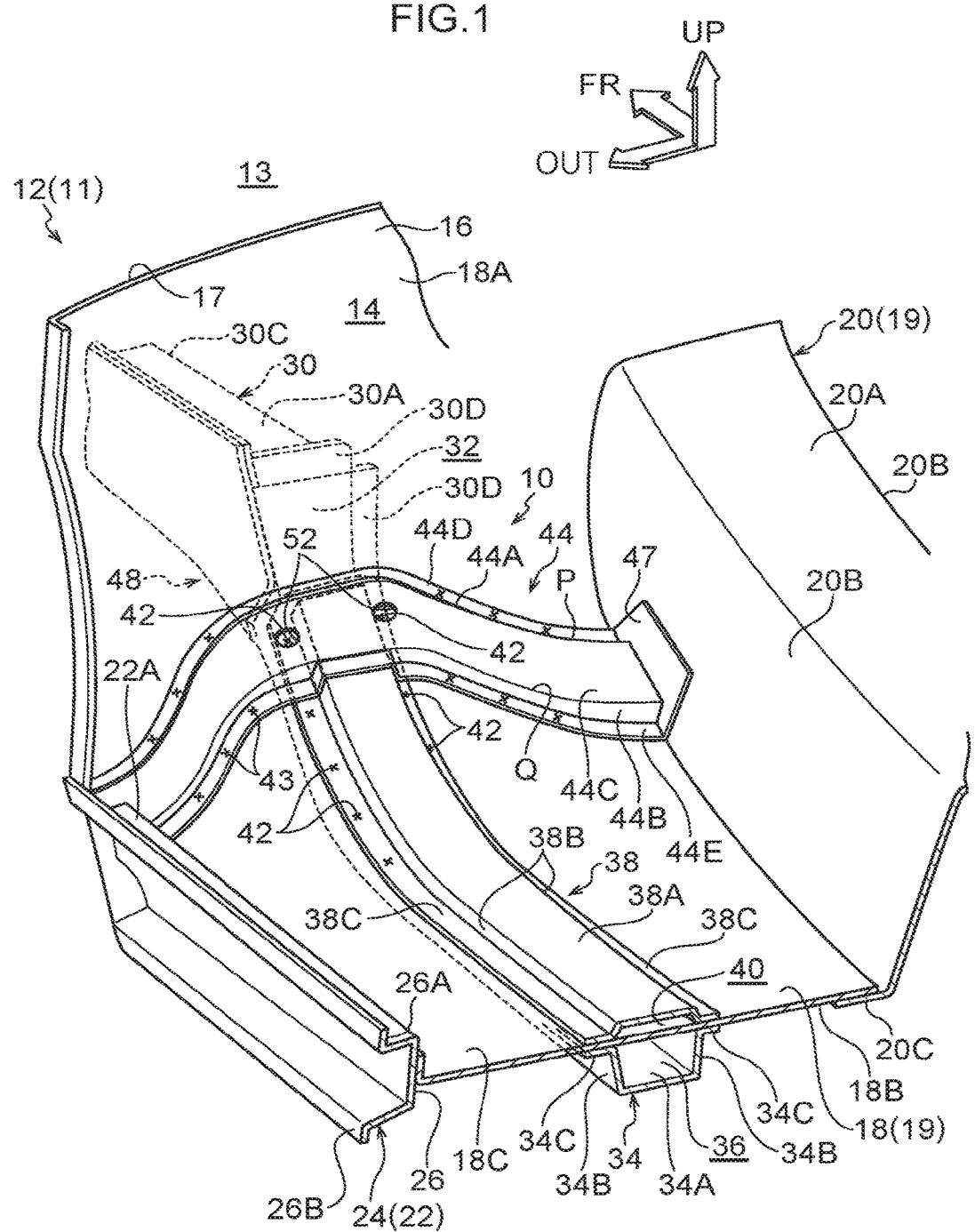
FIG. 1 is a schematic perspective view showing a vehicle framework structure in accordance with a present exemplary embodiment.

As shown in FIG. 1 to FIG. 3, a power unit compartment 13 is provided at a vehicle front portion 12 of a vehicle 11 in which a vehicle framework structure 10 according to the present exemplary embodiment is employed. A power unit, which is not shown in the drawings, is accommodated in the power unit compartment 13. The power unit compartment 13 and a vehicle cabin 14 are separated by a dash panel 16.

An upper portion of the dash panel 16 is a vertical plate portion 16A, which is formed in a substantially vertical plate shape. A lower portion of the dash panel 16 is a toe board portion 16B, which is provided integrally with the vertical plate portion 16A and is formed in an angled plate shape. The toe board portion 16B is angled to the lower side toward the vehicle rear side. A front end portion 18A of a floor panel 18 that structures the floor of the vehicle cabin 14 is joined to a lower end portion 16B1 of the toe board portion 16B. The dash panel 16 and the floor panel 18 are made integral by this join. Joins in the present exemplary embodiment, including joins in the descriptions below, may be, for example, welding by spot welding or the like.

A floor of the vehicle cabin 14 is structured with, for example, a left and right pair of the floor panel 18 and a tunnel 20. To describe this in specific terms, the tunnel 20 extends in the vehicle front-and-rear direction at a vehicle width direction central portion of the floor panels 18 (between the floor panel 18 at the vehicle left side and the floor panel (not shown in the drawings) at the vehicle right side). The tunnel 20 is not shown in FIG. 3. Similarly to FIG. 3, the tunnel 20 is not shown in FIG. 4.

As shown in FIG. 1 to FIG. 3, a cross-sectional shape of the tunnel 20, cut along the vehicle width direction, is a substantial hat shape that opens to the lower side. The tunnel 20 is provided with an upper wall portion 20A that structures an upper portion of the tunnel 20, and a pair of side wall portions 20B that are disposed at the left and right of the upper wall portion 20A. Each of the pair of side wall portions 20B is an angled wall portion that is angled to the respective vehicle width direction outer side toward the lower side. A respective outer flange portion 20C that is inflected toward the vehicle width direction outer side of the tunnel 20 is projected from the lower end of the side wall portion 20B. The outer flange portion 20C is joined to a lower face 18B of the respective floor panel 18. Thus, the floor panels 18 and the tunnel 20 are made integral. The floor panels 18 and the tunnel 20 may be formed integrally of a single plate.

A pair of rockers 22 respectively extend in the vehicle front-and-rear direction at the vehicle width direction outer sides of the floor panels 18. Each rocker 22 includes a rocker outer panel, which is disposed at the vehicle width direction outer side and is not shown in the drawings, and a rocker inner panel 24, which is disposed at the vehicle width direction inner side. Cross-sectional shapes of the rocker outer panel and the rocker inner panel 24, cut along the vehicle width direction, are substantial hat shapes that open to the sides at which the rocker outer panel and the rocker inner panel 24 oppose one another.

An upper flange portion 26A projects to the vehicle upper direction from an upper portion of a general portion 26 of the rocker inner panel 24. A lower flange portion 26B projects to the vehicle lower direction from a lower portion of the general portion 26. Similarly to the rocker inner panel 24, an upper flange portion and a lower flange portion respectively project in the vehicle up-and-down direction from an upper portion and a lower portion of a general portion of the rocker outer panel. The upper flange portion 26A and lower flange portion 26B of the rocker inner panel 24 are joined by welding to the upper flange portion and lower flange portion, respectively, of the rocker outer panel. Thus, a closed cross section portion (not shown in the drawings) that extends in the vehicle front-and-rear direction is formed in the rocker 22.

At each vehicle width direction outer side of the power unit compartment 13, a front side member 30 is disposed between the rocker 22 and the tunnel 20 in the vehicle width direction and extends in the vehicle front-and-rear direction. A cross-sectional shape of the front side member 30, cut along the vehicle width direction, constitutes a substantially rectangular shape, forming a closed cross section portion 32.

The front side member 30 includes, for example, an upper wall portion 30A, a lower wall portion 30B, and a pair of side wall portions 30C. Outer flange portions 30D protrude from the rear ends of each of the upper wall portion 30A and the pair of side wall portions 30C of the front side member 30. Each outer flange portion 30D is inflected to a respective outer side of the closed cross section portion 32 and is joined to a front face 17 of the dash panel 16. The lower wall portion 30B of the front side member 30 is angled to the lower side toward the vehicle rear side and protrudes to the lower side of the floor panel 18.

Herebelow, portions of the front side member 30 as far as the front face 17 of the dash panel 16 are referred to as "the front side member 30", and portions at the rear side relative to the front face 17 of the dash panel 16 are referred to as a "front side member rear 34". That is, the front side member rear 34 is formed integrally with the front side member 30 and is provided at the rear side of the front side member 30. The front side member rear 34 extends in the vehicle front-and-rear direction at the side of the floor panel 18 at which the lower face 18B is disposed. Accordingly, the lower wall portion 30B of the front side member 30 is angled to the vehicle rear side and the lower side and protrudes to the lower side of the floor panel 18, structuring a lower wall portion 34A of the front side member rear 34.

In this exemplary embodiment, the lower wall portion 30B of the front side member 30 and the lower wall portion 34A of the front side member rear 34 are the same member. However, for convenience of description, descriptions are given with the reference symbols changing between the lower wall portion 30B of the front side member 30 and the lower wall portion 34A of the front side member rear 34.

As shown in FIG. 1, a cross-sectional shape of the front side member rear 34, cut along the vehicle width direction, is a substantial hat shape that opens to the upper side. The front side member rear 34 is provided with the lower wall portion 34A and a pair of side wall portions 34B. Outer flanges 34C protrude from upper ends of the side wall portions 34B. The outer flanges 34C are respectively inflected to directions away from one another. The outer flanges 34C are each joined to the lower face 18B of the floor panel 18. Thus, a closed cross section portion 36 with a substantially rectangular shape is formed between the front side member rear 34 and the lower face 18B of the floor panel 18.

A floor reinforcement 38 is provided at the opposite side of the floor panel 18 from the side thereof at which the front side member rear 34 is disposed. In other words, the floor reinforcement 38 is provided at the side of the floor panel 18 at which an upper face 18C is disposed. The floor reinforcement 38 is disposed between the rocker 22 and the tunnel 20 and extends in the vehicle front-and-rear direction.

A cross-sectional shape of the floor reinforcement 38, cut along the vehicle width direction, is a substantial hat shape that opens to the lower side. The floor reinforcement 38 is provided with an upper wall portion 38A and a pair of side wall portions 38B. Outer flanges 38C protrude from lower ends of the side wall portions 38B. The outer flanges 38C are respectively inflected to directions away from one another. The outer flanges 38C are each joined to the upper face 18C of the floor panel 18 (at joining portions 42). Thus, a closed cross section portion 40 with a substantially rectangular shape is formed between the floor reinforcement 38 and the upper face 18C of the floor panel 18.

As shown in FIG. 4, a front wall portion (abutting wall) 38D is provided at the front end of the floor reinforcement 38. A front flange portion 38E protrudes from a lower end of the front wall portion 38D and is inflected toward the front side. The front flange portion 38E is joined to the upper face 18C of the floor panel 18.

As shown in FIG. 1 and FIG. 2, the outer flanges 38C of the floor reinforcement 38 and the outer flanges 34C of the front side member rear 34 are respectively disposed so as to be superposed in plan view. Accordingly, the outer flanges 38C of the floor reinforcement 38 and the outer flanges 34C of the front side member rear 34 are both joined together with the floor panel 18 (at the joining portions 42). The joining portions 42 are indicated with "x" marks in these drawings, but the joining portions 42 are not limited to the positions shown in the drawings.

As shown in FIG. 1 to FIG. 3, a dash cross-member 44 is disposed on the upper face 18C of the floor panel 18. The dash cross-member 44 connects between a front portion 22A of the rocker 22 and the tunnel 20 in the vehicle width direction, at the side of the floor panel 18 at which the front end portion 18A is disposed. As shown in FIG. 3, a cross-sectional shape of the dash cross-member 44, cut along the vehicle front-and-rear direction, is a substantial hat shape that opens to the lower side. The dash cross-member 44 includes a front wall portion 44A, a rear wall portion 44B and an upper wall portion 44C.

As shown in FIG. 1 to FIG. 3, the front wall portion 44A, rear wall portion 44B and upper wall portion 44C are formed continuously along the vehicle width direction. A ridgeline P that serves as a front ridgeline is formed by the front wall portion 44A and the upper wall portion 44C. A ridgeline Q that serves as a rear ridgeline is formed by the upper wall portion 44C and the rear wall portion 44B. Thus, the ridgelines P and Q are formed continuously along the vehicle width direction.

A front flange portion 44D protrudes from a lower end portion of the front wall portion 44A. The front flange portion 44D is inflected toward the front. A rear flange portion 44E protrudes from a lower end portion of the rear wall portion 44B. The rear flange portion 44E is inflected toward the rear. The front flange portion 44D and rear flange portion 44E are each joined to the upper face 18C of the floor panel 18 (at joining portions 43). Thus, a closed cross section portion 46 (described below) is formed between the dash cross-member 44 and the floor panel 18.

As shown in FIG. 2, at the side of the dash cross-member 44 at which the rocker 22 is disposed, an upper flange portion 45 protrudes integrally from the front flange portion 44D, the front wall portion 44A, the upper wall portion 44C, the rear wall portion 44B and the rear flange portion 44E. The upper flange portion 45 is inflected to the upper side. The upper flange portion 45 is joined to the rocker inner panel 24 by welding or the like.

Correspondingly, at the side of the dash cross-member 44 at which the tunnel 20 is disposed, an upper flange portion 47 protrudes integrally from the front flange portion 44D, the front wall portion 44A, the upper wall portion 44C, the rear wall portion 44B and the rear flange portion 44E. The rear flange portion 47 is inflected to the upper side. The rear flange portion 47 is joined to the side wall portion 20B of the tunnel 20 by welding or the like.

As described above, the dash cross-member 44 connects the tunnel 20 with the rocker 22 in the vehicle width direction above the floor panel 18.

As shown in FIG. 1 and FIG. 2, the floor reinforcement 38 is arranged along the vehicle front-and-rear direction between the rocker 22 and the tunnel 20. Therefore, the dash cross-member 44 intersects with the floor reinforcement 38. At an intersection portion 48 at which the dash cross-member 44 intersects with the floor reinforcement 38, the dash cross-member 44 is arranged in the vehicle width direction above the floor panel 18 in a state in which the dash cross-member 44 passes over the floor reinforcement 38. That is, at the intersection portion 48, the dash cross-member 44 is disposed in a state of being superposed over the floor reinforcement 38.

The dash cross-member 44 is formed in a substantial hill shape in plan view. A vehicle width direction central portion of the dash cross-member 44 (at the intersection portion 48 with the floor reinforcement 38, which is described below) is disposed at the front side in the vehicle front-and-rear direction and serves as a peak portion, and the dash cross-member 44 is angled to the vehicle front-and-rear direction rear side toward vehicle width direction outer sides thereof. As shown in FIG. 3, the floor panel 18 is inflected from the front end portion 18A toward the lower side toward the vehicle front-and-rear direction rear side.

Therefore, the upper wall portion 44C of the dash cross-member 44 is usually disposed furthest to the upper side (the upper side in the vehicle up-and-down direction) at the vehicle width direction central portion of the dash cross-member 44 (i.e., the intersection portion 48). The upper wall portion 44C is disposed gradually toward the lower side (the lower side in the vehicle up-and-down direction) toward the two vehicle width direction end sides of the dash cross-member 44. Thus, in the present exemplary embodiment, the height of the upper wall portion 44C of the dash cross-member 44 from the upper face 18C of the floor panel 18 is specified to be substantially the same over the vehicle width direction with reference to the height of the upper wall portion 44C at the intersection portion 48.

Figure 5:
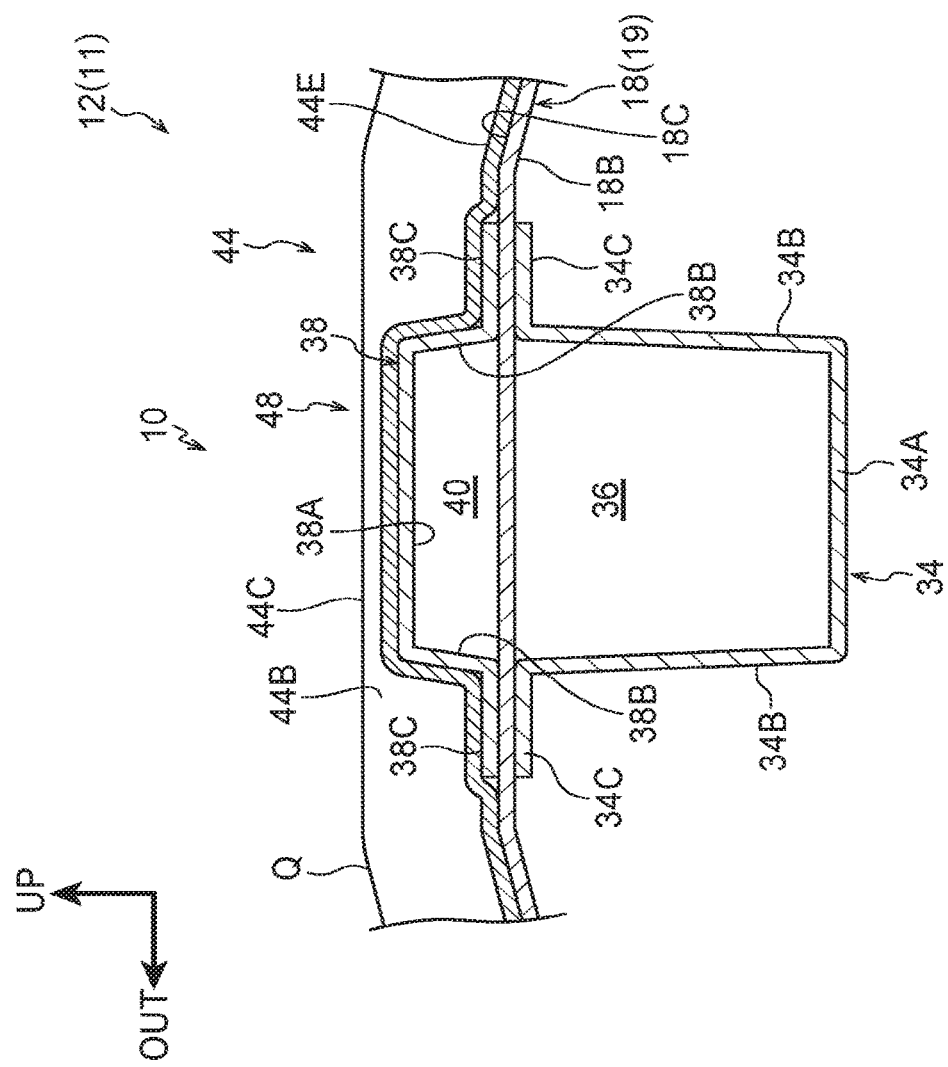
FIG. 5 is a sectional diagram cut along line 5-5 in FIG. 2.

Accordingly, in the present exemplary embodiment as shown in FIG. 1, FIG. 4 and FIG. 5, the rear wall portion 44B of the dash cross-member 44 is formed with a small height at the intersection portion 48, and the rear wall portion 44B and rear flange portion 44E are each formed along the shape of the floor reinforcement 38 in the direction intersecting the direction of extension of the floor reinforcement 38 (i.e., in the width direction). Thus, the height of the upper wall portion 44C of the dash cross-member 44 is specified to be substantially the same over the vehicle width direction.

At the intersection portion 48, the rear wall portion 44B retains some height. Thus, the ridgeline Q is continuous in the vehicle width direction. Furthermore at the intersection portion 48, the rear flange portion 44E abuts against and is joined to the upper wall portion 38A of the floor reinforcement 38. Thus, a closed cross section portion 50 is formed between the upper wall portion 44C of the dash cross-member 44 and the upper wall portion 38A of the floor reinforcement 38.

As mentioned above and as shown in FIG. 1 and FIG. 3, at portions of the dash cross-member 44 other than the intersection portion 48, the front flange portion 44D and rear flange portion 44E of the dash cross-member 44 are joined to the floor panel 18 (at the joining portions 43) in a state in which the front flange portion 44D and rear flange portion 44E abut against the upper face 18C of the floor panel 18. In contrast, at the intersection portion 48 of the dash cross-member 44, the floor reinforcement 38 is disposed at the lower side of the dash cross-member 44.

As shown in FIG. 4, at the intersection portion 48 of the dash cross-member 44, the front wall portion 38D is provided at the front side of the floor reinforcement 38. Accordingly, the front wall portion 44A of the dash cross-member 44 abuts against the front wall portion 38D. The front flange portion 38E that inflects toward the front side protrudes from the lower end of the front wall portion 38D, and the front flange portion 38E is joined to the upper face 18C of the floor panel 18.

As shown in FIG. 2 and FIG. 3, at the intersection portion 48 of the dash cross-member 44, penetrating holes 52 are formed in the dash cross-member 44 at locations that coincide in plan view with the joining portions 42 at which the outer flanges 38C of the floor reinforcement 38, the floor panel 18, and the outer flanges 34C of the front side member rear 34 are joined to one another. That is, in the present exemplary embodiment, the joining portions 42 may be exposed through the penetrating holes 52.

Operation and Effects of Vehicle Framework Structure

Now, operation and effects of the vehicle framework structure according to the present exemplary embodiment are described.

As shown in FIG. 1, in the vehicle framework structure 10 according to the present exemplary embodiment, the floor reinforcement 38 extends in the vehicle front-and-rear direction on the upper face 18C of the floor panel 18. As shown in FIG. 3 to FIG. 5, the floor reinforcement 38 is disposed between the floor panel 18 and the dash cross-member 44 in the vehicle up-and-down direction. The floor reinforcement 38 is joined to the floor panel 18 and to the front side member rear 34.

Thus, in the present exemplary embodiment, because the floor reinforcement 38 is disposed at the lower side of the dash cross-member 44, the floor reinforcement 38 is not divided in the vehicle front-and-rear direction by the dash panel 16. Moreover, because the floor reinforcement 38 is joined to the front side member rear 34, in the present exemplary embodiment, a collision load transmitted from the front side member rear 34 may be transmitted to the floor reinforcement 38 effectively. Thus, deformation of the front side member rear 34 may be suppressed.

Therefore, although not shown in the drawings, deformation of the front side member rear 34 may be suppressed if, for example, a front wheel impacts against the front portion 22A of the rocker 22, the lower side of a front pillar or the like due to a small overlap collision, an oblique collision or the like and a collision load is inputted so as to deform the rear side of the front side member 30 toward the upper side. The term "small overlap collision" refers to a situation in which an impact body collides with a vehicle front face at the vehicle width direction outer side relative to the front side member 30, and the term "oblique collision" refers to a situation in which an impact body collides diagonally from the vehicle width direction outer side of the front side member 30.

The front side member rear 34 forms the closed cross section portion 36 with the lower face 18B of the floor panel 18, and the floor reinforcement 38 forms the closed cross section portion 40 with the upper face 18C of the floor panel 18. Thus, strengths and stiffnesses of these members are improved by the closed cross section portions 36 and 40 being formed at the front side member rear 34 and the floor reinforcement 38, respectively.

The front side member rear 34 and the floor reinforcement 38 are superposed above and below with the floor panel 18 therebetween and these members are joined to one another. Therefore, the floor panel 18 is in a reinforced state, stiffness of the vehicle framework that includes these members may be further improved, and the load transmission efficiency may be raised.

In the present exemplary embodiment, as shown in FIG. 2, the ridgeline P is formed at the dash cross-member 44 by the front wall portion 44A and the upper wall portion 44C to be continuous in the vehicle width direction and the ridgeline Q is formed at the dash cross-member 44 by the rear wall portion 44B and the upper wall portion 44C to be continuous in the vehicle width direction. Therefore, strength and stiffness of the dash cross-member 44 may be improved compared to a structure in which ridgelines are not formed, which is not shown in the drawings. Moreover, a load transmission efficiency of the dash cross-member 44 through the ridgelines P and Q may be improved.

In the present exemplary embodiment, as shown in FIG. 1 and FIG. 5, at the intersection portion 48 at which the dash cross-member 44 intersects with the floor reinforcement 38, the dash cross-member 44 is formed along the shape of the floor reinforcement 38 in the width direction. At portions of the dash cross-member 44 other than the intersection portion 48, the front flange portion 44D and the rear flange portion 44E are joined to the floor panel 18 (at the joining portions 43).

Because the dash cross-member 44 connects the rocker 22 with the tunnel 20 in the vehicle width direction and the dash cross-member 44 is joined to the floor panel 18, when a collision load is inputted from the lower side of the floor reinforcement 38, the dash cross-member 44 acts as a structure that holds down the floor reinforcement 38 from the upper side (a pressing structure). Therefore, strength of the intersection portion 48 may be improved and deformation of the floor reinforcement 38 may be further suppressed.

In the present exemplary embodiment, lengths in the height direction of the rear wall portion 44B of the dash cross-member 44 are formed to be shorter at the intersection portion 48, and the rear wall portion 44B and rear flange portion 44E are both formed along the shape of the floor reinforcement 38 in the width direction. As a result, heights of the upper wall portion 44C of the dash cross-member 44 (from the upper face 18C of the floor panel 18) are formed to be substantially the same over the vehicle width direction. Thus, the upper wall portion 44C may be formed so as not to vary greatly in the height direction.

Thus, because the height of the upper wall portion 44C of the dash cross-member 44 is formed to be substantially the same over the vehicle width direction, the ridgelines P and Q formed at the upper wall portion 44C are formed at substantially the same heights along the vehicle width direction. Consequently, load transmission losses in the dash cross-member 44 may be reduced compared to a structure in which ridgelines P and Q are not formed in straight lines. That is, the load transmission efficiency of the dash cross-member 44 may be further improved.

In the present exemplary embodiment, as shown in FIG. 1 to FIG. 3, at the intersection portion 48 of the dash cross-member 44, the outer flanges 38C of the floor reinforcement 38 are joined to the floor panel 18 and to the outer flanges 34C of the front side member rear 34 at the joining portions 42. The penetrating holes 52 are formed in the dash cross-member 44 at the locations that coincide with the joining portions 42 in plan view. Thus, the floor reinforcement 38, the floor panel 18 and the front side member rear 34 may be joined to one another through the penetrating holes 52.

It is currently very difficult to securely join four or more plates of steel or the like to one another with a welding technology based on, for example, spot welding. In the present exemplary embodiment, the penetrating holes 52 are formed in the dash cross-member 44. Accordingly, sizes of the penetrating holes 52 are specified to be a size into which a gun for spot welding (not shown in the drawings) can be inserted.

Therefore, at the intersection portion 48, the outer flanges 38C of the floor reinforcement 38, the floor panel 18, and the outer flange portions 30D of the front side member rear 34 may be joined by spot welding (at the joining portions 42). Consequently, the efficiency of welding operations may be raised and secure joins may be formed. Hence, joint strengths of the joining portions 42 may be raised and the load transmission efficiency may be improved.

Variant Examples of the Present Exemplary Embodiment

In the present exemplary embodiment, as shown in FIG. 3, the dash panel 16 and the floor panel 18 are made integral by being joined. However, it will be clear that the dash panel 16 and floor panel 18 may be integrally formed of a single plate member.

In the present exemplary embodiment, as shown in FIG. 1 to FIG. 3, the front side member rear 34 is formed integrally with the front side member 30 and is provided at the rear side of the front side member 30. However, it will be clear that the front side member 30 and the front side member rear 34 may be formed as separate members and made integral by being joined to one another.

In the present exemplary embodiment, the dash cross-member 44 is provided at the floor panel 18. However, the dash cross-member 44 may be provided at the dash panel 16 side, or may be provided so as to be disposed across the dash panel 16 and the floor panel 18.

In the present exemplary embodiment, the dash cross-member 44 is formed substantially in the hill shape in plan view with the intersection portion 48 serving as the peak portion. However, the dash cross-member 44 does not necessarily have to be formed in a substantial hill shape. The dash cross-member 44 is not limited to this shape, provided the dash cross-member 44 can connect the front portion 22A of the rocker 22 with the tunnel 20 in the vehicle width direction.

In the present exemplary embodiment, the closed cross section portion 40 is formed between the floor reinforcement 38 and the upper face 18C of the floor panel 18. However, the closed cross section portion 40 is not necessarily required; the shape of the floor reinforcement 38 is not limited by the present exemplary embodiment.

In the present exemplary embodiment, because the ridgeline Q is formed to be continuous in the vehicle width direction, the rear wall portion 44B retains some height at the intersection portion 48. However, the ridgeline Q is not necessarily required.

In the present exemplary embodiment, at the intersection portion 48 of the dash cross-member 44, the dash cross-member 44 is formed along the shape of the floor reinforcement 38 in the width direction. However, the dash cross-member 44 need not necessarily follow the shape of the floor reinforcement 38 in the vehicle width direction. Because the dash cross-member 44 is joined to the floor panel 18 (at the joining portions 43) at locations of the dash cross-member 44 other than the intersection portion 48, the aforementioned pressing structure may be achieved via the joining portions 43.

In the present exemplary embodiment, heights of the dash cross-member 44 are specified so as to be substantially the same over the vehicle width direction, to match the height of the upper wall portion 44C at the intersection portion 48. However, heights of the upper wall portion 44C do not necessarily have to be substantially the same over the vehicle width direction but may be formed such that the intersection portion 48 of the dash cross-member 44 is highest.

In the present exemplary embodiment, at the intersection portion 48 of the dash cross-member 44, the front wall portion 44A of the dash cross-member 44 abuts against the front wall portion 38D provided at the front end of the floor reinforcement 38. However, the front wall portion 44A does not necessarily have to abut against the front wall portion 38D. Moreover, the front wall portion 38D is not necessarily required.

Hereabove, the present invention has been described in accordance with the exemplary embodiment, but the present invention is not limited by this exemplary embodiment. The exemplary embodiment and various variant examples may be used in suitable combinations, and it will be clear that numerous modes may be embodied within a technical scope not departing from the gist of the present invention.

What is claimed is:

1. A vehicle framework structure comprising:
   a tunnel disposed at a vehicle width direction central portion of a floor panel of a vehicle, the tunnel extending in a vehicle front-and-rear direction;
   a pair of rockers disposed at each vehicle width direction outer sides of the floor panel, the rockers extending in the vehicle front-and-rear direction;
   a dash cross-member that connects front portions of the rockers with the tunnel in a vehicle width direction;
   a front side member rear that is provided under the floor panel at a vehicle front-and-rear direction rear side of a front side member, the front side member being disposed at a vehicle front-and-rear direction front side of the floor panel and extending in the vehicle front-and-rear direction, and the front side member rear forming a closed cross section portion between the front side member rear and a lower face of the floor panel; and
   a floor reinforcement that extends in the vehicle front-and-rear direction above the floor panel, a vehicle front-and-rear direction front portion of the floor reinforcement being disposed between the dash cross-member and the floor panel in a vehicle up-and-down direction, and the floor reinforcement being joined to the floor panel and to the front side member rear,
   wherein, at an intersection portion at which the dash cross-member intersects with the floor reinforcement, a lower portion of the dash cross-member is formed closely along a bending shape of the floor reinforcement in the vehicle width direction.

2. The vehicle framework structure according to claim 1, wherein the dash cross-member comprises:

a front wall portion that is arranged along the vehicle width direction, at a front portion of the dash cross-member in the vehicle front-and-rear direction;

a rear wall portion that opposes the front wall portion and is arranged along the vehicle width direction, at a rear portion of the dash cross-member in the vehicle front-and-rear direction;

an upper wall portion that is disposed at an upper portion of the dash cross-member in the vehicle up-and-down direction, spans between an upper end portion of the front wall portion and an upper end portion of the rear wall portion, and is arranged along the vehicle width direction;

a front ridgeline formed by the front wall portion and the upper wall portion, the front ridgeline being continuous in the vehicle width direction; and a rear ridgeline formed by the upper wall portion and the rear wall portion, the rear ridgeline being continuous in the vehicle width direction.

3. The vehicle framework structure according to claim 1, wherein, at an intersection portion at which the dash cross-member intersects with the floor reinforcement, the dash cross-member is formed along a shape of the floor reinforcement in a direction intersecting the direction in which the floor reinforcement extends.

4. The vehicle framework structure according to claim 3, wherein the upper wall portion is disposed at the upper portion of the dash cross-member in the vehicle up-and-down direction, and heights of the upper wall portion from the floor panel are specified to be the same over the vehicle width direction with reference to a height of the upper wall portion at the intersection portion.

5. The vehicle framework structure according to claim 2, wherein the front wall portion is disposed at the front portion of the dash cross-member in the vehicle front-and-rear direction, an abutting wall is provided at a distal end portion of the floor reinforcement in the vehicle front-and-rear direction, and the front wall portion abuts against the abutting wall at the vehicle front-and-rear direction rear side of the front wall portion.

6. The vehicle framework structure according to claim 1, wherein, at an intersection portion at which the dash cross-member intersects with the floor reinforcement, a penetrating hole is formed at a location of the intersection portion that coincides in plan view with a joining portion at which the floor reinforcement, the floor panel and the front side member rear are joined.

7. The vehicle framework structure according to claim 1, wherein the floor reinforcement forms a closed cross section portion between the floor reinforcement and an upper face of the floor panel.

8. The vehicle framework structure according to claim 1, wherein the dash cross-member is disposed on an upper face of the floor panel at a side of the floor panel at which a front end portion of the floor panel is disposed.

9. The vehicle framework structure according to claim 1, wherein the dash cross-member is formed in a substantial hill shape in plan view, an intersection portion at which the dash cross-member intersects with the floor reinforcement being a peak portion and being disposed at a vehicle front-and-rear direction front side of the substantial hill shape, and the substantial hill shape being angled to the vehicle front-and-rear direction rear side toward vehicle width direction outer sides thereof.

10. The vehicle framework structure according to claim 1, wherein the floor panel is inflected from a front end portion thereof toward a lower side toward the vehicle front-and-rear direction rear side.

11. A vehicle framework structure comprising:

a tunnel disposed at a vehicle width direction central portion of a floor panel of a vehicle, the tunnel extending in a vehicle front-and-rear direction;

a pair of rockers disposed at each vehicle width direction outer sides of the floor panel, the rockers extending in the vehicle front-and-rear direction;

a dash cross-member that connects front portions of the rockers with the tunnel in a vehicle width direction;

a front side member rear that is provided under the floor panel at a vehicle front-and-rear direction rear side of a front side member, the front side member being disposed at a vehicle front-and-rear direction front side of the floor panel and extending in the vehicle front-and-rear direction, and the front side member rear forming a closed cross section portion between the front side member rear and a lower face of the floor panel; and a floor reinforcement that extends in the vehicle front-and-rear direction above the floor panel, a vehicle front-and-rear direction front portion of the floor reinforcement being disposed between the dash cross-member and the floor panel in a vehicle up-and-down direction, and the floor reinforcement being joined to the floor panel and to the front side member rear, wherein the dash cross-member comprises:

a front wall portion that is arranged along the vehicle width direction, at a front portion of the dash cross-member in the vehicle front-and-rear direction;

a rear wall portion that opposes the front wall portion and is arranged along the vehicle width direction, at a rear portion of the dash cross-member in the vehicle front-and-rear direction;

an upper wall portion that is disposed at an upper portion of the dash cross-member in the vehicle up-and-down direction, spans between an upper end portion of the front wall portion and an upper end portion of the rear wall portion, and is arranged along the vehicle width direction;

a front ridgeline formed by the front wall portion and the upper wall portion, the front ridgeline being continuous in the vehicle width direction; and a rear ridgeline formed by the upper wall portion and the rear wall portion, the rear ridgeline being continuous in the vehicle width direction, and wherein the front wall portion is disposed at the front portion of the dash cross-member in the vehicle front-and-rear direction, an abutting wall is provided at a distal end portion of the floor reinforcement in the vehicle front-and-rear direction, and the front wall portion abuts against the abutting wall at the vehicle front-and-rear direction rear side of the front wall portion.

12. A vehicle framework structure comprising:

a tunnel disposed at a vehicle width direction central portion of a floor panel of a vehicle, the tunnel extending in a vehicle front-and-rear direction;

a pair of rockers disposed at each vehicle width direction outer sides of the floor panel, the rockers extending in the vehicle front-and-rear direction;

a dash cross-member that connects front portions of the rockers with the tunnel in a vehicle width direction;

a front side member rear that is provided under the floor panel at a vehicle front-and-rear direction rear side of a front side member, the front side member being disposed at a vehicle front-and-rear direction front side of the floor panel and extending in the vehicle front-and-rear direction, and the front side member rear forming a closed cross section portion between the front side member rear and a lower face of the floor panel; and a floor reinforcement that extends in the vehicle front-and-rear direction above the floor panel, a vehicle front-and-rear direction front portion of the floor reinforcement being disposed between the dash cross-member and the floor panel in a vehicle up-and-down direction, and the floor reinforcement being joined to the floor panel and to the front side member rear, wherein, at an intersection portion at which the dash cross-member intersects with the floor reinforcement, a penetrating hole is formed at a location of the intersection portion that coincides in plan view with a joining portion at which the floor reinforcement, the floor panel and the front side member rear are joined.

\* \* \* \* \*